United States Patent [19]

Nakano et al.

[11] Patent Number: 4,469,409
[45] Date of Patent: Sep. 4, 1984

[54] HOMOGENEOUS ALIGNMENT LAYER FOR LIQUID CRYSTAL DISPLAY DEVICE

[75] Inventors: Fumio Nakano, Hitachi; Kishiro Iwasaki, Hitachiota; Seikichi Tanno, Hitachi, all of Japan

[73] Assignee: Hitachi, Ltd., Tokyo, Japan

[21] Appl. No.: 409,058

[22] Filed: Aug. 18, 1982

[30] Foreign Application Priority Data

Aug. 21, 1981 [JP] Japan .................. 56-130253

[51] Int. Cl.$^3$ ................................. G02F 1/13
[52] U.S. Cl. ..................................... 350/341
[58] Field of Search ........................ 350/341

[56] References Cited

U.S. PATENT DOCUMENTS

| 3,854,793 | 12/1974 | Kahn ................. 350/341 X |
| 3,955,881 | 5/1976 | Yaguchi et al. .......... 350/341 |
| 3,961,843 | 6/1976 | Nakamura et al. ....... 350/341 |
| 3,963,324 | 6/1976 | Fergason et al. ........ 350/341 |
| 3,994,567 | 11/1976 | Matsuo et al. ......... 350/341 |
| 4,252,414 | 2/1981 | Kinugawa et al. ...... 350/341 X |

FOREIGN PATENT DOCUMENTS

| 2635630 | 2/1977 | Fed. Rep. of Germany ...... 350/341 |
| 54-143246 | of 1979 | Japan . |
| 55-36150 | of 1980 | Japan . |
| 2026190A | 1/1980 | United Kingdom ............ 350/341 |

Primary Examiner—John K. Corbin
Assistant Examiner—Richard F. Gallivan
Attorney, Agent, or Firm—Antonelli, Terry & Wands

[57] ABSTRACT

A liquid crystal display device comprises transparent electrode substrates having an aligning coating film of a homogeneous mixture comprising a silanol oligomer modified by an aromatic ring-containing silane group, and an organic polymer at the electrode side, where the heat resistance and adhesiveness of the coating film to the electrode substrates are improved without any undercoating film therebetween.

11 Claims, 2 Drawing Figures

HOMOGENEOUS ALIGNMENT LAYER FOR LIQUID CRYSTAL DISPLAY DEVICE

BACKGROUND OF THE INVENTION

This invention relates to a liquid crystal display device, and particularly to a twist nematic (TN) type liquid crystal display device.

A TN type liquid crystal display device will be described, referring to the accompanying drawings.

FIG. 1 is a cross-sectional view of one example of a TN type liquid crystal display device, in which a first substrate 1 and a second substrate 1' of transparent glass, etc. are juxtaposed at a predetermined clearance, for example, at 5–15 μm, and their open peripheries are sealed with a sealing material 2, such as frit glass, and organic adhesive, etc. A nematic liquid crystal 3 is placed in a space formed by the substrates and the sealing material. The clearance can be provided by means of a spacer 4 of, for example, fiber glass, glass powder, etc. The sealing material 2 can serve also as a spacer without using any special spacer 4.

Electrodes 5 and 5' in a predetermined pattern are formed on the inner surfaces of the first and second substrates 1 1', respectively, and liquid crystal-aligning films 7, and 7' are further provided on the surfaces of the substrates to be in contact with a liquid crystal, and on the liquid crystal-aligning films are formed liquid crystal-aligning surfaces 6 and 6' capable of aligning the liquid crystal molecules in the vicinity of their surfaces into a desired direction. Such aligning surfaces 6 and 6' extend over the aligning films 7 and 7' of, for example, organic polymer on the substrates having the electrodes, respectively, and are formed by applying the so-called rubbing treatment to the surfaces, for example, by rubbing the surfaces with cloth in a predetermined direction.

In the TN type liquid crystal display device, a liquid crystal is filled into the space between glass substrates to form a liquid crystal layer, in which the liquid crystal molecules must be aligned substantially in parallel to the glass substrates and also can be twisted in a predetermined direction, usually in a direction at an angle of 90°, in the liquid crystal layer. This liquid crystal-aligning characteristic can be obtained by aligning films 7 and 7' having aligning surfaces 6 and 6', which are formed on the juxtaposed glass substrates. For the aligning films, usually organic polymers are used, and various organic polymers have been proposed, among which organic polymers containing an imide ring or a quinazoline ring have a good aligning property and can form an excellent aligning film whose aligning performance is not degraded even by a high temperature treatment.

On the other hand, the sealing material 2 is usually frit glass or an organic adhesive. To melt the frit glass as the sealing material 2, a temperature as high as about 400° C. is required even for a low melting frit glass. When, for example, an aligning film comprised of a heat-resistant organic polymer containing at least one of the imide ring and the quinazoline ring is used as the aligning films 7 and 7' to this end, that is, when an organic polymer film having a heat resistance of higher than 400° C. is used, deterioration will take place at a lower temperature at the parts in contact with the glass substrates 1 and 1', and consequently the attrition grooves made in one direction by rubbing will be damaged by the said heat treatment at 400° C., or the organic polymer film itself will be dissipated thereby, and the aligning films 7 and 7' will lose the property of aligning the liquid crystal.

For example, it has been found by thermal balance analysis, ultraviolet analysis, etc. that a film of polyimidisoindroquinazolinedion (PIQ, a trademark of the product made by Hitachi Kasei Kogyo K.K., which will be hereinafter referred to as PIQ) as the organic polymer film has a heat resistance of about 450° C. However, when a PIQ film having a thickness of about 1,000 Å is provided each on soda glass substrates 1 and 1' without any undercoating film therebetween and when attrition grooves are provided on the surfaces of the PIQ films by cloth, etc. to obtain aligning films 7 and 7', as shown in FIG. 1, the property of aligning the liquid crystal molecules will be lost by heat treatment at about 350° C. The heat deterioration will take place at parts in direct contact with the aligning films 7 and 7'. To prevent such deterioration, the undercoating films 8 and 8' are provided therebetween.

On the other hand, when an adhesive of organic polymer is used as the sealing material, the heat resistance will be no more problem owing to the low heat-treating temperature. However, the adhesive of organic polymer can be permeated by water, and the moisture endurance of aligning films will be a problem when used in a liquid crystal display device. When no undercoating films are used as in FIG. 1, no good adhesiveness between the aligning films 7 and 7' and the glass substrates 1 and 1' can be maintained in a moisture condition, and moisture permeates through the sealing material 2 from the outside into between the aligning films 7 and 7' and the glass substrates 1 and 1', thereby lowering the surface resistance of the glass substrates 1 and 1'. When the display parts are actuated by applying a voltage to the liquid crystal display device, the areas that should not be actuated around the display parts will be actuated. That is, an unwanted overdisplay phenomena (which will be hereinafter called "leaking") appears.

For example, as shown in FIG. 1, transparent electrodes 5 and 5' are formed on soda glass substrates 1 and 1' respectively, and PIQ films having a thickness of about 1,000 Å are further formed thereon, respectively. Then, the PIQ films are made into aligning films 7 and 7', respectively, by providing attrition grooves thereon by rubbing. Then, the peripheral ends of the substrates are sealed with an epoxy adhesive, after spacers 4 are provided therebetween to provide a space for a liquid crystal. A liquid crystal 5, which comprises an azoxy liquid crystal as a host and an ester-based liquid crystal having a positive dielectric anisotropy, is filled into the space to provide a liquid crystal display device. The thus prepared device is subjected to a test under a moisture condition at 70° C. and 95% relative humidity (RH). The so-called leaking appears after about 50 hours. This corresponds to a life of 6 months to one year under the normal environmental condition, which is a practical problem.

To solve the problem, undercoating films 8 and 8' are provided, as shown in FIG. 2. That is, undercoating films 8, or 8' of metal oxide is provided between the glass substrate 1 or 1' and the transparent electrode 5 or 5', and the aligning film 7 or 7' of organic polymer is formed on the subcoating film 8 or 8'. The heat resistance of the aligning film 7 or 7' and the adhesiveness between the aligning film 7 or 7' and the glass substrate 1 or 1' are improved by providing the undercoating film 8 or 8' therebetween. For the undercoating film, metal oxides, particularly silicon oxide, aluminum oxide, etc. are used (see Japanese Laid-open Patent Application No. 95264/79). Heretofor, liquid crystal display devices with high reliability free from any practical problem have been prepared in this manner. However, a step of providing an undercoating film is indispensable, and thus the process is complicated. The cost is inevitably increased.

SUMMARY OF THE INVENTION

An object of the present invention is to provide a liquid crystal display device with an improved heat resistance of aligning films and an improved adhesiveness between the aligning film and the glass substrate without providing any undercoating film therebetween, in which the problems of the prior art have been solved.

The present invention provides a liquid crystal display device which comprises transparent electrode substrates having an aligning coating film of a homogeneous mixture comprising a silanol oligomer modified by an aromatic ring-containing silane group, and an organic polymer at the electrode side.

The present invention is based on such a finding that a silanol oligomer, which has been so far used for forming an undercoating film, can be dissolved in a solvent for many organic polymers as used for forming an aligning film to form a homogeneous solution by substituting a portion of hydroxyl groups of the silanol oligomer with an aromatic ring-containing silane groups. It has been further found that the film prepared from the solution has an equivalent performance as an aligning film to that of the conventional aligning film prepared only from an organic polymer, and further has a good heat resistance and a good adhesiveness between the aligning film and a glass substrate without providing any undercoating film therebetween.

As a result of further studies, it has been found that the aligning film of the present invention has several advantages as not observed in the prior art. For example, the PIQ film as the conventional aligning film is slightly colored, and thus has a disadvantage in the appearance as a liquid crystal display device. An aligning film prepared from PIQ and the silanol oligomer modified with an aromatic ring-containing silane group in combination has a greatly improved transparency when compared on the same level of film thickness, and the liquid crystal display device using the aligning films of the present invention has an improved appearance.

The silanol oligomer is an oligomer represented by the following formula:

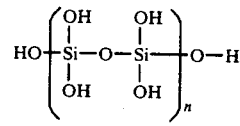

where n is an integer of 5 to 10.

The silanol oligomer is dissolved in an appropriate solvent, and the resulting solution is applied to a glass substrate, and baked to obtain a film of silicon oxide, which has been so far often used as an undercoating film. That is, a film having an essentially good harmony and high adhesiveness to a glass substrate can be prepared therefrom.

However, the silanol oligomer as such is not compatible with many organic polymers for use as an aligning film, and thus a homogeneous film cannot be obtained. The present inventors have found that the compatibility of silanol oligomer with the organic polymers can be improved by substituting a portion of hydroxyl groups of the silanol oligomer with aromatic ring-containing silane groups, that is, by allowing the silanol oligomer to react with an aryl silane to prepare a silanol oligomer modified by an aryl silane group.

The silanes containing an aromatic ring for use in the present invention are preferably those containing a methoxy group or an ethoxy group, and include, for example, the following compounds:

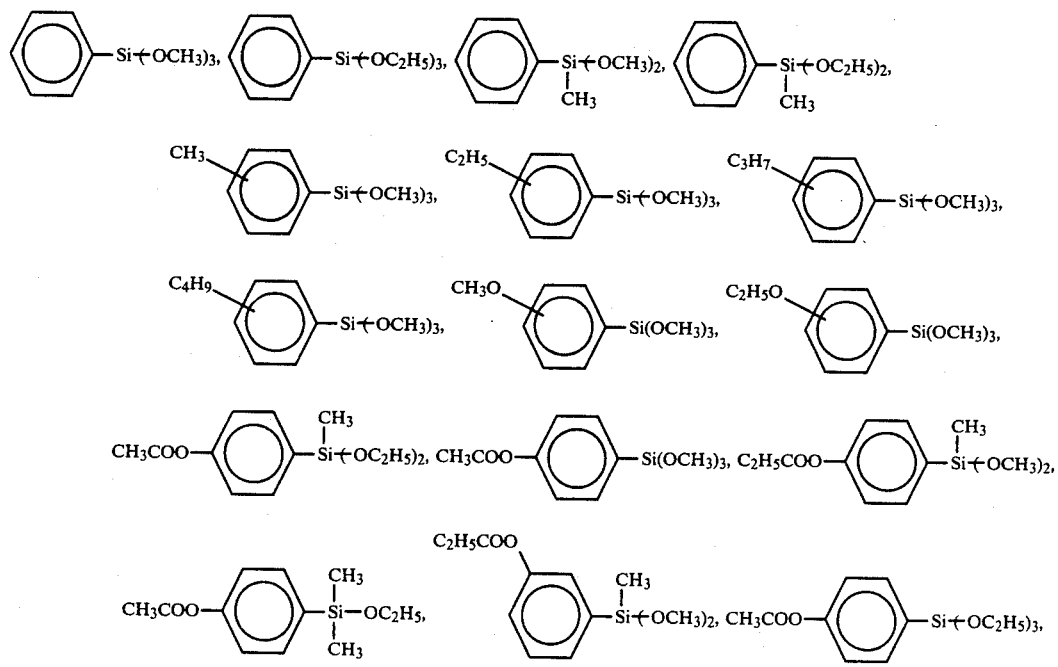

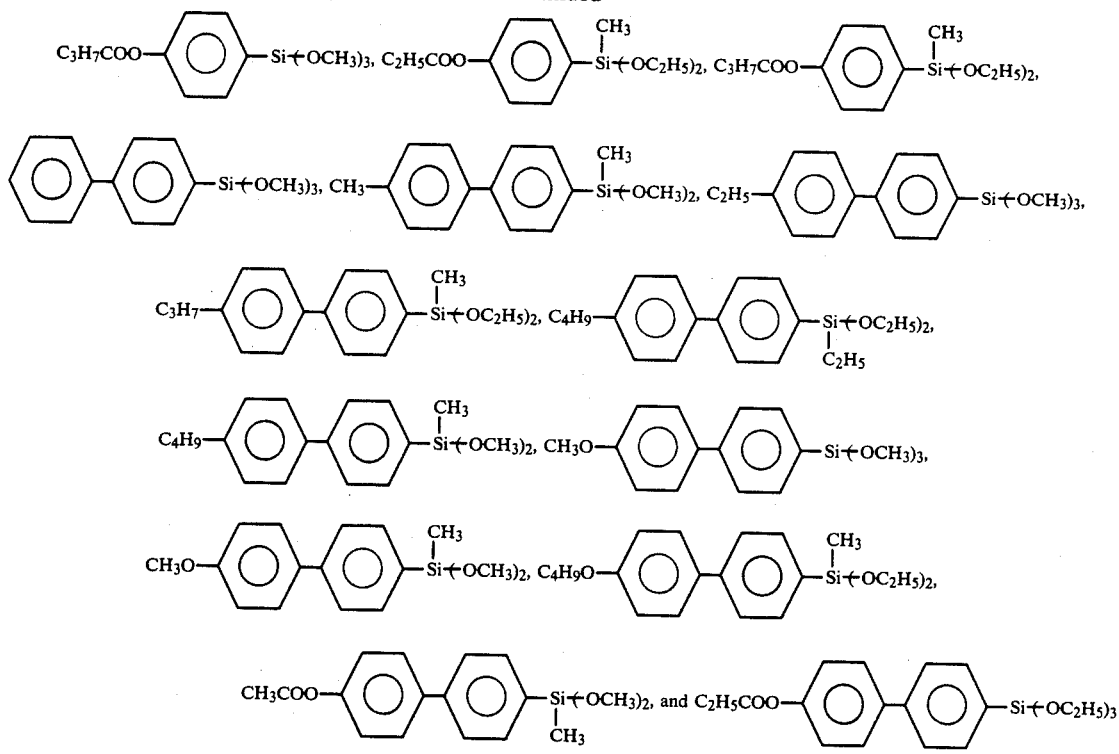

The aromatic ring for the silane group is preferably any of the groups represented by the following general formulae:

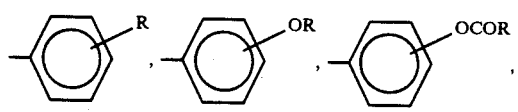

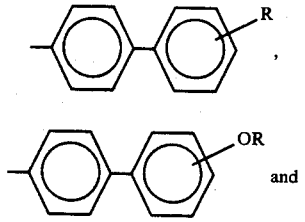

where R represents a hydrogen atom or an alkyl group having 1 to 8 carbon atoms.

These silane compounds can be represented by the following general formula:

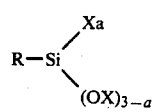

wherein R is an aromatic ring-containing group, X is the same or different and represents a methyl or ethyl group, and a is an integer of 0 to 2.

The silanes react with a silanol oligomer to form a silanol modified by the silane, as given below, referring to paramethoxyphenyltrimethoxysilane,

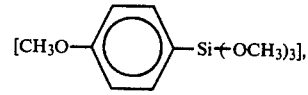

as an example:

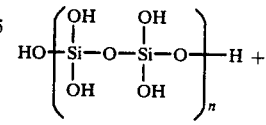

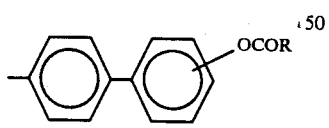

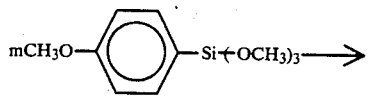

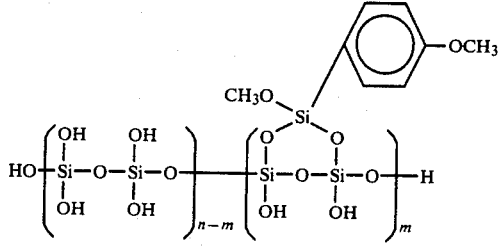

The position to which the phenylsiloxane binds is not always regular, and the phenysiloxane seems to react with a OH group at an appropriate position at random.

The foregoing reaction proceeds substantially quantitatively, and the number of OH groups to be substituted depends upon the number of the aromatic ring-containing silane groups. It can be said that silanol is compatible with many organic polymers, so long as at least 10% by mole of the OH groups of the silanol is substituted with the aromatic ring-containing silane groups by modification. On the other hand, when 100% by mole of the OH groups are substituted with the aromatic ring-containing silane groups, a good adhesiveness to the glass substrate cannot be obtained. Thus, substitution of about 90% by mole of the OH groups with the aromatic ring-containing silane groups is an upper limit.

The foregoing reaction can be carried out under a relatively mild condition. A predetermined amount of the desired aromatic ring-containing silane is added to a silanol oligomer solution, and the resulting mixture is stirred in an inert gas atmosphere at 50° to 70° C. for about 2 to about 3 hours, whereby silanol oligomer modified by an aromatic ring-containing silane group can be obtained. The process of the reaction can be traced by gas chromatography, and the end of reaction can be found by detecting no more peak of the aromatic ring-containing silane monomer at all.

Various organic polymers can be used in the present invention, and any organic polymer can be used, so long as it has a function and an effect as an aligning film, because it is the organic polymer that can contribute to the alignment of liquid crystal. Basic requirement from the organic polymer is that no liquid crystal dissolves in it. In addition, some other important requirements must be taken into account. First of all, the organic polymer itself has a high heat resistance. In this respect, polyamic acids capable of forming polyimide, polyamide-imide, polyhydrazide-imide, polyimide-isoindroquinazoline, etc. by ring closure are useful organic polymers. Other organic polymers having a relatively high heat resistance include aliphatic polyamides, aromatic polyamides, aromatic polyether amides, etc. which are soluble in a solvent.

Another important requirement is a high transparency of film itself, because an organic polymer having a high transparency can give a good appearance when used in a liquid crystal display device.

Still further indispensable requirement is a high refractive index. An organic polymer having a high refractive index is useful for preventing transparent electrodes patterned on the glass substrate from visualization when unactivated. The refractive index of the alignment film must be desirably in a range of 1.65 to 1.85. Since the refractive index of silanol oligomer modified by an aromatic ring-containing silane group is about 1.5, an organic polymer must have a refractive index of at least 1.7. All the foregoing organic polymers having a high heat resistance also have the desirable refractive index, and thus are very useful in this respect.

In some applications, an organic polymer capable of being made into a film at a low temperature is desirable. For example, when a heat-deformable material such as a plastic film, etc. is used as a substrate, the organic polymer must be made into a film at not higher than 150° C. To this end, the organic polymer requiring no ring closure reaction is useful, and can maintain such characteristic even when admixed with the silanol oligomer modified by an aromatic ring-containing silane group.

Any mixing ratio of a silanol oligomer modified by an aromatic ring-containing silane group to an organic polymer can be selected, but a mixing ratio of 1:1 by weight in terms of solid matters can give a good result.

The present invention will be described in detail below, referring to Examples on the basis of the accompanying drawings, but will not be limited thereto.

PREFERRED EMBODIMENTS OF THE INVENTION

REFERENCE EXAMPLE

Figure 1:
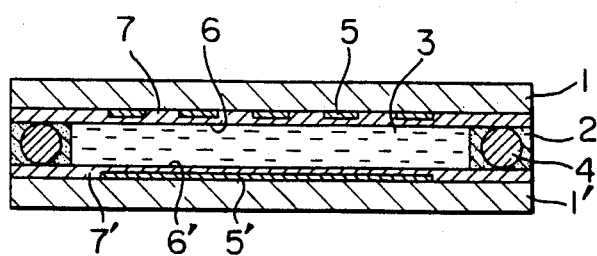
FIGS. 1 and 2 are cross-sectional views each illustrating a TN type liquid crystal display device.

Silanol oligomer was prepared by solution polymerization in the following procedure.

20.5 g of ethyl silicate $Si(OC_2H_5)_4$, 37.4 g of ethanol, 14.4 g of ethyl acetate, 1.5 g of acetic anhydride and 150 mg of phosphorus pentoxide were charged simultaneously into a 200-ml flask with a thermometer, a stirrer and a cooler, and subjected to reaction at 70° C. for 1.5 hours. Then, 7 g of deionized water was added thereto, and the resulting mixture was subjected to reaction at 70° C. for 1.5 hours, whereby silanol oligomer was obtained.

EXAMPLE 1

Paramethoxyphenyltrimethoxysilane was added to a 10% butylcellusolve solution of the silanol oligomer obtained in Reference Example, and the resulting mixture was subjected to reaction in a nitrogen gas atmosphere at 50° to 70° C. with stirring to obtain a solution of silanol oligomer modified by the silane group. The mixing ratio of the paramethoxyphenyltrimethoxysilane to the OH group of the silanol oligomer was 11% by mole.

Then, a solution of polyamic acid capable of forming polyimidisoindroquinazolinedion by ring closure reaction (PIQ, a product made by Hitachi Kasei Kogyo K.K., Japan) was added to the resulting solution at a mixing ratio of 1:1 by weight in terms of solid matters to prepare a homogeneous coating solution for forming an aligning film.

The surface of a glass substrate with a patterned transparent electrode thereon was coated with the coating solution by spinner coating, and dried at 250° C. for one hour to obtain an aligning film having a thickness of about 800 Å. Then, the film surface was rubbed with a cotton gauze to form attrition grooves. The thus prepared aligning film could align liquid crystal molecules up to 450° C. When a low melting frit glass mixture comprised of 100 parts by weight of a basic composition consisting of 28% by mole of $B_2O_3$, 61% by mole of $P_2O_5$, 5% by mole of ZnO, 5% by mole of CuO, and 1% by mole of $Bi_2O_3$, 1.5 parts by weight of $SiO_2$, and 2.0 parts by weight of $Al_2O_3$ was used as the sealing material 6, the glass substrate 1 and 1' had to be sealed by firing at 400° C. for 30 minutes. When the aligning film of the present Example was applied to a display device with the said frit glass sealing material, the resulting display device had a good alignment and had a good display.

Another liquid crystal display device was prepared from two glass substrates each with the same aligning film as above on the inner surface by placing a liquid crystal composition comprised of azoxy liquid crystal as a host and an ester-based liquid crystal having a positive dielectric anisotropy into a space between the substrates and by sealing the peripheral ends of the substrates with an epoxy adhesive. The display device was exposed to a moisture condition at 70° C. and 95% RH, and it was found that no leaking took place for over 5000 hours. This corresponds to a life of over 10 years under the normal environmental condition.

All the foregoing display devices had such a good appearance that no electrode pattern was visualized when not actuated, and also had a transmittance as high as 80% at 400 nm, i.e. a good transparency.

The refractive index of the aligning film was 1.70 according to an automatic ellipsometer, made by Mizoziri Optical Company, Japan.

EXAMPLES 2-15

Solutions of silanol oligomers modified by silane groups were prepared from various silane compounds shown in the following Table 1 in the same manner as in Example 1, and the resulting solutions were admixed with PIQ in the same manner as in Example 1 at a mixing ratio of 1:1 to prepare coating solutions for forming an aligning film. Aligning films were formed on the substrates from these coating solutions, and frit-sealed display devices were prepared in the same manner as in Example 1. All of the resulting display devices had a good aligning performance and a good display.

At the same time, epoxy adhesive-sealed display devices were prepared in the same manner as in Example 1, and subjected to a moisture test at 70° C. and 95% RH. The results are shown in Table 1. No leaking was observed at all for over 300 hours throughout all the cases. All the display devices had such a good appearance that no electrode pattern was visualized at all when not actuated. The refractive index of all these films was 1.70.

EXAMPLES 16-18

In these Examples, aligning films applicable to low temperature treatment are shown.

The solution of the silanol oligomer modified by silanes shown in Example 1 was mixed with organic polymers shown in the following Table 2 at a mixing ratio of 1:1 by weight in terms of the solid matters to prepare coating solutions for forming an aligning film.

The thus prepared solutions were applied to substrates, then dried at the temperature shown in Table 2, and rubbed with cloth to form aligning films. Liquid crystal display devices were prepared therefrom, using an epoxy adhesive curable at 120° C. All the display devices had a good aligning performance. The display devices were subjected to a moisture test at 70° C. and 95% RH, and it was found that no leaking was observed after over 3000 hours.

TABLE 2

| Ex. No. | Organic polymer | Coating soln concentration (wt. %) | Drying temp./time | Refraftive index of film |
|---|---|---|---|---|
| 16 | Aliphatic polyamide (Trogamide-T, trademark of Dynamite Nobel Co.) | 5.0 | 120° C./1 hr. | 1.70 |
| 17 | Aromatic ether polyamide* | 5.0 | 100° C./1 hr. | 1.75 |
| 18 | Polyaminobismaleimide (Kermid-500, trademark of Rhone-Poulenc) | 5.0 | 120° C./1 hr. | 1.68 |

*Synthesized from 2,2-bis[4-(4-aminophenoxy)phenyl]-propane and isophthalic dichloride by solution polymerization.

COMPARATIVE EXAMPLE 1

An 8% N-methylpyrolidone solution of PIQ was applied to the surface of glass substrate having a patterned transparent electrode threon by spinner coating, and the resulting film was dried at 250° C. for one hour to obtain an aligning film having a thickness of about 800 Å. Then, the film surface was rubbed with a cotton gauze to form attrition grooves. A liquid crystal display device as shown in FIG. 1 was prepared from the thus prepared substrates by using the same low melting film glass as the sealing material 6, as used in Example 1. The display device had a poor display with many domains.

Another liquid crystal display device was prepared from the same substrates by using the same epoxy adhesive as the sealing material 6, as used in Example 1, and subjected to a moisture test at 70° C. and 95% RH. Leaking appeared after about 50 hours.

TABLE 1

| Ex. No. | Silane compound | Silane content (% by mole) | State after exposure to 70° C. and 95% RH for 300 hours |
|---|---|---|---|
| 2 | p-Ethoxyphenyltrimethoxysilane | 11.0 | No leaking |
| 3 | " | 9.1 | " |
| 4 | " | 6.7 | " |
| 5 | " | 5.0 | " |
| 6 | " | 3.2 | " |
| 7 | Benzylmethyldimethoxysilane | 5.0 | " |
| 8 | Benzyltriethoxysilane | 5.0 | " |
| 9 | Benzyldimethylethoxysilane | 5.0 | " |
| 10 | p-Methylphenyldiethoxysilane | 5.0 | " |
| 11 | Biphenyltriethoxysilane | 5.0 | " |
| 12 | Phenyldimethylethoxysilane | 5.0 | " |
| 13 | p-n-Butylphenyldimethylethoxysilane | 5.0 | " |
| 14 | p-n-Octylphenyldimethylethoxysilane | 5.0 | " |
| 15 | p-Acetoxyphenyldimethylethoxysilane | 5.0 | " |

These devices had a transmittance of 70% at 400 nm and a yellowish appearance. The refractive index of the film was 1.73.

COMPARATIVE EXAMPLE 2

Soda glass substrates were dipped in a solution of silanol oligomer in a solvent comprised mainly of alcohol, taken up and fired at 500° C. to obtain a silicon oxide film having a thickness of about 1,500 Å. Then, a transparent electrode was provided thereon, and the same PIQ aligning film having a thickness of about 800 Å as in Comparative Example 1 was formed on the silicon oxide film.

Figure 2:
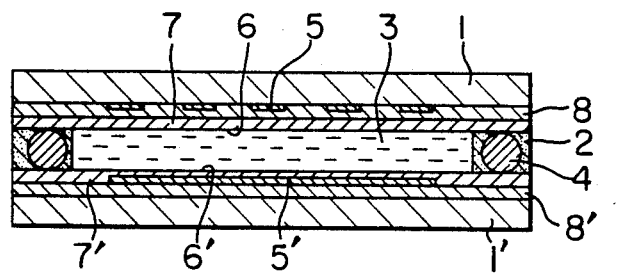

A liquid crystal display device as shown in FIG. 2 was prepared from the thus prepared substrates by using the same low melting frit glass as the sealing material 6 as used in Example 1. The display device had a good display with no domains.

Another liquid display device as shown in FIG. 2 was prepared from the same substrates by using the same epoxy adhesive as the sealing material 6, as used in Example 1, and subjected to a moisture test at 70° C. and 95% RH. No leaking appeared up to 300 hours.

As described above, the present invention provide a liquid crystal display device of good display having a high heat resistance and a high moisture resistance without any undercoating film.

The electrode substrate of the present invention can be applied not only to a TN type, liquid crystal display device, but also to a guest-host type, liquid crystal display device, a liquid display device utilizing a phase transition of cholesteric liquid crystal, a liquid crystal display device using smectic liquid crystal, etc.

What is claimed is:

1. A liquid crystal display device which comprises transparent electrode substrates having an aligning coating film of a homogeneous mixture comprising a silanol oligomer modified by an aromatic ring-containing silane group, and an organic polymer at the electrode side.

2. The liquid crystal display device according to claim 1, wherein the aromatic ring of the silanol oligomer modified by the aromatic ring-containing silane group is one of the groups represented by the following formulae:

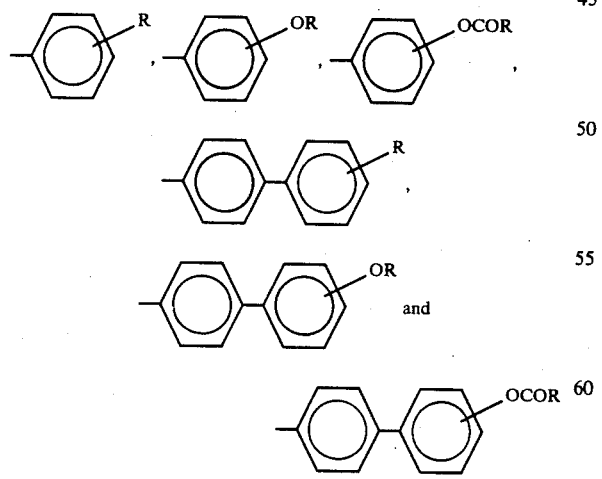

wherein R is a hydrogen atom or an alkyl group having 1 to 8 carbon atoms.

3. A twist-nematic type liquid crystal display device which comprises transparent electrode substrates having an aligning coating film of a homogeneous mixture comprising a silanol oligomer modified by an aromatic ring-containing silane group, and an organic polymer at the electrode side.

4. The liquid crystal display device according to claim 3, wherein the aromatic ring of the silanol oligomer modified by the aromatic ring-containing silane group is one of the groups represented by the following formulae:

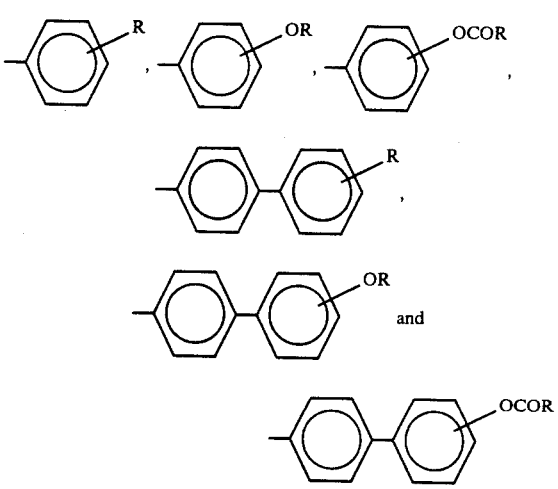

wherein R is a hydrogen atom or an alkyl group having 1 to 8 carbon atoms.

5. The liquid crystal display device according to any one of claims 1 to 4 wherein the aligning coating film has a refractive index of 1.65 to 1.85.

6. The liquid crystal display device according to any one of claims 1 to 4 wherein the organic polymer is a polyamic acid capable of forming polyimide by ring closure reaction.

7. The liquid crystal display device according to any one of claims 1 to 4 wherein the organic polymer is selected from soluble aromatic polyamide, aromatic polyether amide and aliphatic polyamide.

8. The liquid crystal display device according to any one of claims 1 to 4 wherein the silanol oligomer modified by an aromatic ring-containing silane group is the one, 10 to 90% by mole of OH groups of whose silanol oligomer is substituted by the aromatic ring-containing silane groups.

9. The liquid crystal display device according to any one of claims 1 to 4 wherein the homogeneous mixture has a mixing ratio of the silanol oligomer modified by an aromatic ring-containing silane group to the organic polymer of about 1:1 by weight in terms of solid matters.

10. A liquid crystal display device which comprises transparent electrode substrates having an aligning coating film of a homogeneous mixture comprising a silanol oligomer modified by a silane group with one aromatic ring having an alkyl group having 1 to 8 carbon atoms, and an organic polymer at the electrode side.

11. A twist-nematic type liquid crystal display device which comprises transparent electrode substrates having an aligning coating film of a homogeneous mixture comprising a silanol oligomer modified by a silane group with one aromatic ring having an alkyl group having 1 to 8 carbon atoms, and an organic polymer at the electrode side.

* * * * *